June 21, 1938. O. JANZEN 2,121,699
SELF STARTING SINGLE-PHASE ALTERNATING CURRENT SYNCHRONOUS MOTOR
Filed Aug. 22, 1936 2 Sheets-Sheet 1
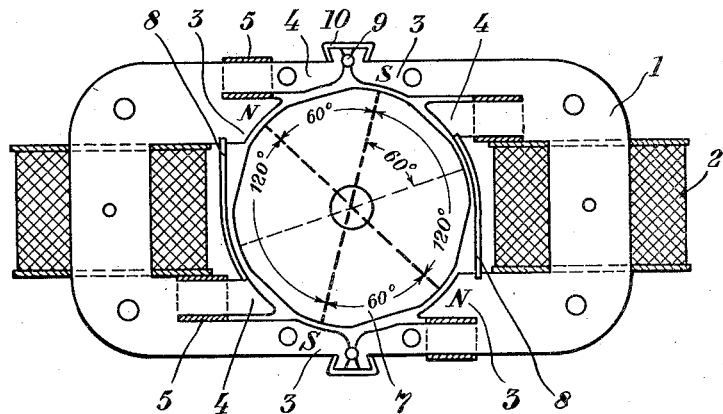
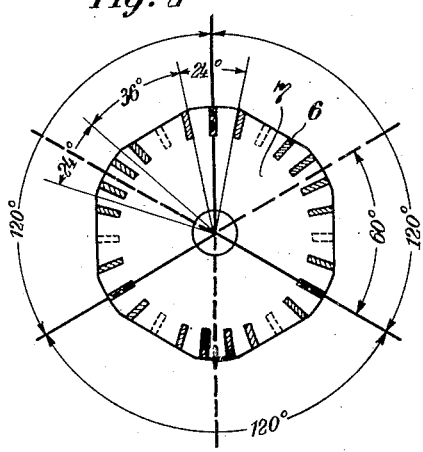 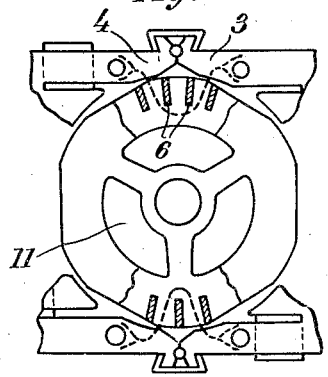
Inventor:
Otto Janzen Patented June 21, 1938

2,121,699

UNITED STATES PATENT OFFICE 2,121,699

SELF-STARTING SINGLE-PHASE ALTERNATING CURRENT SYNCHRONOUS MOTOR

Otto Janzen, Berlin-Hermsdorf, Germany

Application August 22, 1936, Serial No. 97,470
In Germany February 17, 1936

15 Claims. (Cl. 172—278)

Numerous proposals have already been made for self-starting single-phase alternating current synchronous motors, with the result that those motors which were really perfected asynchronously and synchronously running could be used only for the purposes of driving clocks or electric meters, whereas they could not be used for larger outputs, such as are required, for instance, in phonographs or the like, even by constructing the motor on an enlarged scale.

One group of these proposals chiefly concerned high-speed motors, in which the rotor and stator had the same number of poles and the rotor had the speed corresponding to the number of poles of the stator. The other group of these proposals was directed to low-speed motors in which the number of pole teeth of the rotor amounted to a multiple of the number of stator poles. The motors so proposed have advantages and disadvantages at the same time. Motors in the first group have the disadvantage that the copper of the cage winding loses the greatest part of its effect during synchronous running, since only just as much current is induced in the winding as corresponds to the variation of the magnetic field in the rotor tooth while passing from one pole to the other, whereby only a fraction of the maximum possible output is obtained. Therefore, the starting torque has a very weak point shortly before reaching synchronism, so that the motor, as soon as it has to start under load, cannot overstep this point and reach its synchronous speed. The advantage of such motors, however, is that during synchronous running they have a very good efficiency, due to the fact that the magnetism of the iron in the rotor is not continuously reversed and, therefore, this energy loss, which is merely converted into heat, is saved. These motors run simply as reaction motors, like the synchronous motors with a copperless rotor according to the principle of the phonic wheel which, as is well-known, have a very good efficiency.

In the second, low-speed, group of motors, in which the number of rotor poles amounts to a multiple of the number of stator poles, the abovementioned weak point in the starting torque which arises shortly before synchronism does not appear so pronounced, but the efficiency is substantially lower than in the first group, which is due to the fact that the stator pole, which must embrace a certain part of the rotor circumference, covers a larger number of rotor poles and that, since the rotor can only advance by one rotor pole division during one alternation, the magnetism of the rotor pole together with its neighbors is reversed at each alternation during the movement within the angle covered by the stator pole, whereby energy which is useless in the cage winding and converted into heat is consumed, since the induced rotor pole, on its advancement during one alternation, does not meet the correct counter-polarity but, during several alternations, still moves under the same pole. This unfavorable magnetic behavior of the motor causes such poor efficiency that motors for greater outputs cannot be constructed at all in practice on this principle. The great difference between the speed of, for instance, a two-pole stator and the speed of a synchronous twelve-pole rotor, is, in this case, also by no means usefully employed for the torque during synchronous running, but, on the contrary, the motor receives such a great slip owing to the abovementioned unfavorable magnetic behavior that the true asynchronous speed in itself is only quite a small amount above the synchronous speed. These well-known motors have no arrangements which could enable locking of the rotor in accordance with the number of stator poles already at 500 revolutions, if the higher speed corresponding to the stator pole pitch were really existent to prevent the rotor from jumping to a super-synchronous speed, unless devices for this purpose are provided in the form of auxiliary magnets.

Single-phase synchronous motors have also been proposed which ran asynchronously and synchronously with a six-pole stator and salient six-pole rotor, but when running entirely without load, they tend to run at a speed above synchronism, which has to be prevented by means of mechanical brakes and, therefore, such motors also cannot be regarded as true synchronous motors.

The most favorable condition for a synchronous motor would result if the motor, on starting, had the properties of a normal asynchronous motor and if the rotor, at its working speed, were to run somewhat more slowly than the asynchronous rotating field; for instance, a four-pole motor would operate most favorably at about 1400 revolutions. This condition is unobtainable in practice, because the necessary pole pitch cannot be provided. It must therefore be endeavored, at the synchronous speeds determined by the pole pitch, to equip a motor electrically in such a manner that this condition arises, that is, that a motor with six poles and 1000 revolutions at 50 cycles has an asynchronous speed at about 1100 revolutions. The efficiency will then give the same condition as with a true asynchronous motor with six poles which runs at 900 revolutions under load. This problem is practically solved by the invention and the new synchronous motor, in regard to its efficiency compared with that hitherto obtainable, is not much worse, as might be expected, but is, on the contrary, considerably better than that of an asynchronous motor of the same size and speed.

The invention consists essentially in that in a motor having a synchronous speed corresponding to a motor constructed with six poles, a stator is provided, the four equally strong pronounced poles of which are subdivided into main and auxiliary poles and the poles are arranged at unequal angular spacings of 60° and 120° with changing polarity and produce two rotating fields of different speed, which act on a rotor provided with six pole-projections and a cage winding, in such a manner that, from the two different rotating fields, a third asynchronous speed, which is somewhat above the synchronous speed corresponding to the small angular spacing and the rotor division, is obtained.

These and further features of the invention are hereinafter explained in greater detail with reference to the accompanying drawings, in which Fig. 1 diagrammatically illustrates a side view, partially in section, of the motor in one form of construction given by way of example;

Fig. 2 diagrammatically illustrates an example of a form of construction of the rotor with its cage winding;

Fig. 3 illustrates part of the magnetic flux between the stator and rotor;

Figure 4:
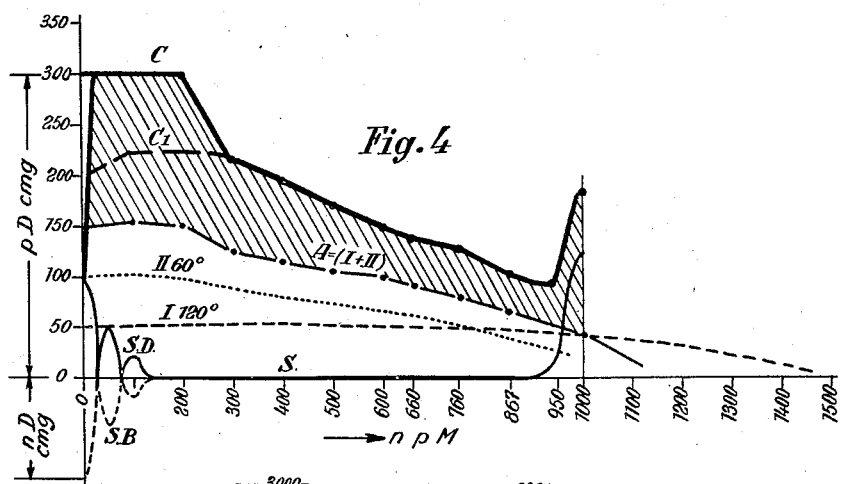
Fig. 4 illustrates, in a number of diagrams, the operating conditions of the motor.

The stator of the motor is assembled from two identical U-shaped double pole-pieces, each of which is provided with an exciting winding 2 and constitutes in itself an effective stator, these pole-pieces, however, producing a new mode of operation by virtue of their particular assembly. Each limb of each double pole-piece 1 is subdivided into main poles 3 and auxiliary poles 4 with a short-circuited winding or shading coil 5, the main poles of each half of the stator subtending an angle of 120° from center to center, within which the exciting winding 2 is provided on the yokes of the double pole-pieces. The main poles and also the auxiliary poles have approximately the same enclosure as a six-pole rotor division, that is, are arranged at a geometrical angle of about 30°. If one of these stator-halves were assembled with a smooth rotor provided with a cage winding, and a 50-cycle alternating current were sent through the exciting winding, then the rotor would assume, in accordance with its copper resistance, a speed corresponding to the main pole angle of 120°. The actual rotating field in this pole section would, of course, have a speed of 2000 revolutions, but, owing to the one-sided influence, the rotor would have a considerable slip.

In explanation of this, in general, the synchronous rotor speed is determined by the number of the stator poles, provided that the stator poles are mounted symmetrically on the stator circumference, in which case the intervening angles are the same. In a motor with a single pair of poles, the positive pole and the negative pole are displaced with reference to each other by a 180° angle, and the synchronous rotor speed at 50 cycles per second is 50x60x1/1 or 3000 R. P. M. Should, however, one of the poles be moved to the right or to the left, and should the other pole remain fixed in position, the synchronous rotor speed in spite of the same number of poles would not remain at 3000 R. P. M. but would be determined by the smaller angle between these poles; in other words, it would be correspondingly smaller. While it can be said that with symmetrically arranged poles the synchronous rotor speed is determined by the number of the pairs of poles, it can be said, however, with equal force that the synchronous rotor speed is determined by the intervening space or the angle between a positive pole and a negative pole. Should, however, the arrangement of the two poles be unsymmetrical, as is the case here, the second method of determination of the synchronous rotor speed must be used, that is, by considering the pole angle. A pole angle of 60° corresponds to a symmetrical number of three pairs of poles, the synchronous rotor speed is then 50x60x1/3 equals 1000; with a pole angle of 120° the synchronous rotor speed is 50x60x2/3 equals 2000. The magnetic field between poles with a pole angle of 60° is stronger than the magnetic field between poles with a pole angle of 90° or 120°, because the path of the lines of force in the first instance is shorter and the leakage is less. For this reason, the starting torque generated in a smaller pole angle is stronger than that from a larger pole angle or pole distance.

In the present invention, if the two stator-halves are assembled together as illustrated, a four-pole stator is at first obtained which, in the position of its main poles, has relatively different angles, namely two of 120° and two of 60°. At the points where the two double pole-pieces 1 of unlike polarity touch, the equally wide auxiliary poles 4 are situated between the main poles 3 lying at an angle of 60°. Owing to this relatively different angular position of 60° and 120° of the four equally strong main poles, the following advantageous effect results. The angular spacing of 60° acts decisively on the synchronous speed and produces a strong asynchronous starting torque, because the angular spacing of 60° is obviously smaller than that of 90° of a symmetrically arranged four-pole asynchronous stator. On reaching the synchronous speed, the copper of the cage winding 6 in the rotor 7 will certainly become almost ineffective within the angle of 60° (see Fig. 4), but notwithstanding this, the weak point is bridged-over shortly before synchronism, this being done by the second rotating field arising owing to the angular spacings of 120° of the main poles in both double pole-pieces 1. By this means, therefore, the disadvantage of the above-mentioned well-known motors is obviated, but in this case the most valuable factor giving good efficiency, namely, the mode of operation of a reaction motor, has been retained, since, with regard to the angle of 60°, both the rotor division and the stator division coincide and, for this part, rotate with the same rotating field. For this part of the motor, the change of polarity in the stator and rotor also coincides according to law during running, so that the magnetism of the rotor iron, in this case, is not reversed.

In addition to the four equally strong main poles and the four auxiliary poles, the stator described has two thinner main poles without auxiliary poles, which are formed by the iron closing plates 8, well-known per se, provided between the pole limbs of the double pole-pieces 1. These iron closing plates each simultaneously receive the outer stray flux of the associated exciting coil 2 and are each so shaped that the half connected to the auxiliary pole 4 follows the arc of the stator bore, while the other half connected to the main pole 3 extends tangentially to the stator bore. These magnetic closing pieces 8 therefore furnish the fifth and sixth poles, so that the stator at least partly has the effect of a six-pole stator. The partial arc of the iron closing plates 8 act particularly advantageously for picking-up the rotor at the synchronous speed.

The above-described stator has, for the asynchronous part working on a normal smooth rotor (without pole surfaces) with a cage winding, a rotating field of 60° which, at 50 cycles, in practice, stipulates a speed of less than 1000 revolutions, and has a second rotating field of 120°, the speed of which is practically below 2000 revolutions. These two rotating fields together give a resultant asynchronous speed corresponding approximately to an angle between 68° and 72°, according to the resistance in the cage winding and according to the magnetic closure at the point of contact of the two stator-halves. This resultant speed amounts to a mean value of about 1150 revolutions. The same stator, however, causes at the same time a synchronous torque at 1000 revolutions, which results from the reactionary effect of the same pole pitch of the stator and rotor. The resultant speed would in itself be higher, but, during running, the induced rotor section is picked up by the pole limbs when it emerges from the 60° angle, since the magnetic effect in this rotor section has not yet disappeared. The same action would occur in a smooth rotor without pole surfaces. This results in a certain negative torque which prevents the rotor from rotating its still induced pole out of the field of the 60° division, which is shown with great clarity in the steep gradient of the output curve $B^1$ in Fig. 5.

If it is desirable, for any reasons dictated by the purpose for which the motor is to be used, to increase or decrease the resultant asynchronous speed, this can be achieved in a very simple manner by means of the pins 9, which, after assembly of the two stator-halves by means of the non-magnetic clamps 10, are wedged into the channels formed between adjacent limbs of the stator-halves to hold them firmly together, in a manner well-known per se. According to whether these pins consist of magnetic or non-magnetic material, or magnetic material over only a part of their length, or fill only part of the full depth (equal to the stator width) of the channel in which they are wedged, the magnetic closure between the two stator-halves and thus the magnetic field of the auxiliary poles is influenced, so that on its being strengthened, the starting torque increases and the resultant speed decreases. The motor in the latter case is stronger in starting, but is somewhat weaker in the synchronous speed range. It is also possible, by varying the copper resistance in the rotor, to obtain a similar effect, but not to the same degree and in the same simple and convenient manner.

The above-described stator can be employed with equal advantage both for an asynchronous motor and a self-starting synchronous motor. The rotor for the latter is illustrated in Fig. 2 in a form of construction given by way of example and is provided in a manner well-known per se with six flats, so that six pronounced pole-projections arise. Whereas, hitherto, the pole-projections and gaps in synchronous motors were usually made approximately equal in width, experiments have shown that this equality in small self-starting rotors with a cage winding is not advantageous and it is substantially more favorable if the flats at the rotor are made considerably wider than the pole-projections. It has been found that the motor shows the most favorable out-put conditions as well as absolutely certain synchronous running with a ratio of the peripheral extent of the rotor over the salient portion to the peripheral extent of the rotor over the flat portion of 2:3, although a relatively large asynchronous torque exists, the speed of which is above the synchronous speed. A rotor provided with this ratio of division, however, can never start of its own accord if the number of copper rods of the cage winding corresponds, according to prior proposals, approximately to the number of pole-projections of the rotor. The rotor, on the contrary, should preferably be provided with an odd number of copper rods in the cage winding, this number being so chosen that a uniform distribution of weight in the rotor is obtained and the otherwise unavoidably heavy vibration of the latter is avoided. In the case of smaller motors with the form of stator according to the invention, the numbers of 15, 21, 27, 33 etc., have proved to be preferable for the rods of the cage winding. With, for instance, a 15-rod cage winding, the motor has good characteristics during synchronous running, but the starting torque when the motor is stationary is either very great or very small, according to the particular angular position of the rotor pole-projection with respect to the stator pole. This varying starting torque results from the fact that the magnetic field arising finds little inductive reactance due to the small number of copper rods and, thus, although the rotor pole is strongly attracted, it is in turn also greatly impeded on emerging from the magnetic field of the stator pole.

In order to impart to the motor a starting torque which is uniform to some degree, it is advantageous to make the number of copper rods in the cage winding as large as possible compared with the number of pole-projections of the rotor, so that several copper rods are situated within one pole-projection. However, this of course is possible with smaller rotor diameters only when the cage winding is formed of flat rods in a manner well-known per se, since with round rods in greater number, the iron cross-section between them would be reduced too much and, on the other hand, the quantity of iron enclosed by the cage winding is, as is well-known, of great importance for the working. When using flat rods for the copper winding, as is shown in Figs. 2 and 3, the greatest possible iron cross-section can be brought into action. It positively follows from the above-mentioned spaced arrangements of 15, 21, 27, 33 etc. copper rods that, with a six-pole rotor, the copper rods of the adjacent poles are always displaced by half a division, but, on the contrary, in every alternative pole, the same iron and copper conditions again exist, which also cause an equal distribution of weight in the rotor. Thus, the six-pole rotor according to Fig. 2 shows, at a width of the pole-projections of 24° and a width of the rotor flats or pole-gaps of 36°, that is, at a ratio of these widths of 2:3, a division of 27 for the cage winding, so that the number of copper rods within the adjacent poles is always displaced by half a division. The cage winding itself consists of only 21 rods, as it has been found that the copper rods, indicated by dotted lines, which fall entirely within the flats can only unfavorably influence the starting condition and, therefore, are preferably omitted.

In the rotor illustrated in Fig. 2, it can be clearly seen that with the division of 27, every three poles arranged at an angle of 120° have exactly the same quantities of iron and copper and, consequently, also the same weight conditions, which are equally different from the symmetrically interposed poles. Thus, in one set of poles displaced relatively to one another by 120° there will be found in each case three copper rods and in the intermediate set of poles, in each case, four copper rods. It can be seen from this that the rotor has an asymmetrical distribution of the copper rods and iron cross-sections between adjacent poles, which is necessary for the production of as uniform a starting torque as possible, but nevertheless is also perfectly symmetrical in its weight distribution, so that unbalance vibrations of the rotor are avoided.

The narrowing of the iron poles within two adjacent copper rods, which occurs owing to the high number of copper rods in the rotor, has the material advantage that, at the points of contact of the unlike pole-limbs of the double pole-pieces 1, the magnetic field cannot enter and leave the iron of the rotor within two copper rods without effect. To assist this effect, both contiguous parts of the unlike stator pole-limbs 3 and 4 are bevelled, as illustrated in Fig. 3, in such a manner that their mutual spacing is wider at the widest point than the iron width within two copper rods in the rotor, whereby the magnetic field, on its path through the rotor, is positively passed through the cage winding and thus must perform work.

Fig. 4 shows a combination of several diagrams which illustrate the mode of operation of the motor according to the invention. In these diagrams, A, C and $C_1$ represent the exactly measured torque in cmg. in accordance with the speed of a small motor, the rotor of which has a diameter of 39.5 mms. and a length of 30 mms. and which, on the average, absorbs 21 watts. The torques, corresponding to the angles of 60° and 120°, indicated in the curves I and II, could not, however, be measured, as they only come into action when coupled together. They are therefore inserted from estimated values. The curve A, however, which represents the resultant of the two curves I and II, was accurately recorded by means of a stroboscope and eddy current brake, a smooth asynchronous rotor with 27 flat rods being employed. Likewise, the curve C was recorded, the same rotor, provided, however, with the pole-forming flats according to Fig. 2, having been measured. The curve S shows the pure synchronous torque from the reactionary effect of the iron, while the curve lines SD and SB occurring at the beginning of this curve respectively show the synchronous torque and the synchronous braking torque of the rotor when starting, which arises at a rotor provided with pronounced poles, at the moment of starting, according to its position with respect to the stator poles. If the rotor is in its most favorable starting position, it receives a starting torque which increases the torque of the cage winding, otherwise it tends to run in reverse and only a still stronger torque of the cage winding can assist the rotor over this obstacle. For this reason, the self-starting synchronous motors with pronounced rotor poles and equal stator division always have an equally strong starting torque according to their rotor position on being started. Therefore, the curve C of the synchronous motor also shows a mean starting torque of 200 cmg., indicated in the curve $C_1$, while the weaker was measured at 100 cmg., but the stronger at 300 cmg. The weaker starting torque of 100 cmg. occurs, as has been already mentioned above, when the rotor pole is in its most unfavorable position, which, however, is only the case within a quite small angular position. The slightest movement in the direction of running leads to a sudden increase in the torque, as is shown by the curve C in Fig. 4. In the hatched area between curves A and C, it is clearly shown by how much the output of such a synchronous motor, that is, if the reactionary effect of the iron of the pronounced poles can still be used in addition, is better than that of the equally large asynchronous motor. Of course, the utilization of this effect is possible only when all the parts of the motor are correctly matched to one another in the above-described manner.

Figure 5:
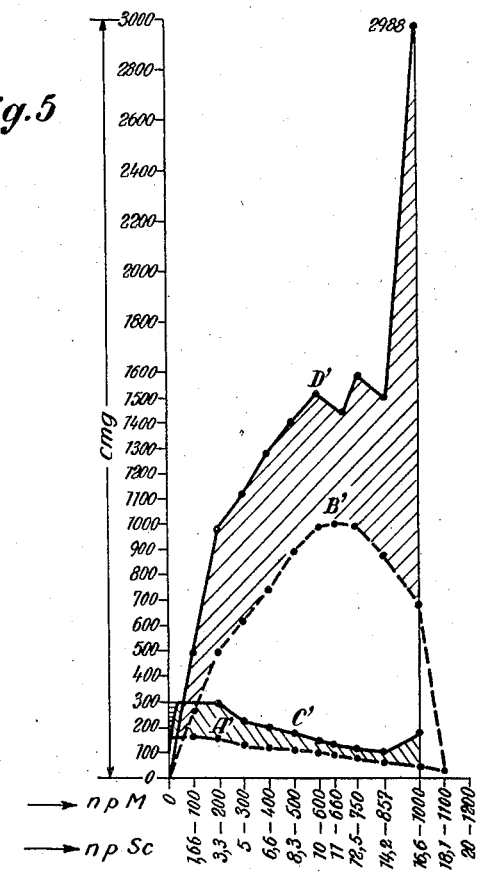
Fig. 5 illustrates the torque and output diagrams of the motor.

Curves A' and C' of Fig. 5 show the torques of the motor in accordance with the number of revolutions per minute and the curves B' and D' show the output characteristic in accordance with the number of revolutions per second. The curve A' shows the torque of an asynchronous rotor without pole faces, the curve B' the output characteristic resulting therefrom, the curve C' the torque of the same rotor with pole faces, and the curve D' the output characteristic resulting from the latter curve. In this case also, the hatched area between the output curves B' and D' clearly shows the increase in the output by the additional utilization of the reactionary effect of the pole iron.

With regard to the curves according to Fig. 5, it should also be noted that the values of the curves B' and D' for determining the output are also to be multiplied by $2\pi$. Thus, during synchronous running at 1000 revolutions, an output of 2988 cmg.$\times 6.28 = 18675$ cmg./sec. results.

The advantages of the motor according to the invention are founded not only on the material improvement in the efficiency, but also on its extremely simple and cheap mode of construction. When stamping the stator plates, a hardly appreciable iron loss occurs. The treatment of the individual stator parts and their finishing is very simple, which applies, in particular, to the winding and insulation of the coils. The flat construction of the motor, the height of which is only somewhat greater than its rotor diameter, renders the motor particularly advantageous as a talking machine motor as well as for other building-in purposes, owing to its small compact form. The motor is also excellently suited for driving time-switch gearing, for which the rotor according to Fig. 3 can be provided, up to the limit of strength, with spoke-forming recesses 11, in order, thus, by the greatest possible reduction of weight, to accelerate starting as well as attaining the synchronous speed.

I claim:

1. A self-starting single-phase alternating current synchronous motor, comprising a stator having an exciting winding having four equally strong pronounced poles which are sub-divided into main and auxiliary poles, the main poles being arranged at unequal angular spacings of 60° and 120° with alternate poles of like polarity, and a rotor provided with six pole-projections and a cage winding, the parts being proportioned and arranged such that said main poles produce two rotating fields of different speeds and from said two fields a third asynchronous speed, somewhat higher than the synchronous speed corresponding to the smaller angular spacing and the rotor division, is obtained.

2. In a self-starting single-phase alternating current synchronous motor, the combination of a rotor having six pole-projections and a cage winding with a stator comprising two identical U-shaped double pole-pieces each provided with main and auxiliary poles, said main poles being arranged at unequal angular spacings of 60° and 120° with alternate poles of like polarity, and the unlike poles touching, the smaller of said unequal angular spacings determining the speed of the motor, and an exciting winding on each of the yokes of said double pole-pieces and lying within the greater of said angular spacings.

3. In a self-starting single-phase alternating current synchronous motor, the combination of a rotor having six pole-projections and a cage winding with a stator comprising two identical U-shaped double pole-pieces arranged with their limbs contiguous, clamping means for holding said double pole-pieces together, comprising non-magnetic clamps embracing and spacer members between the contiguous ends of said limbs, main and auxiliary poles on said double pole-pieces, said main poles being arranged at unequal angular spacings of 60° and 120° with alternate poles of like polarity, and an exciting winding on each of the yokes of said double pole-pieces and lying within the greater of said unequal angular spacings.

4. In a self-starting single-phase alternating current synchronous motor, the combination of a rotor having six pole-projections and a cage winding with a stator comprising two identical U-shaped double pole-pieces arranged with their limbs contiguous, non-magnetic means holding said double pole-pieces together, spacer members of selectively determinable magnetic permeance between the contiguous ends of said limbs for adjusting the degree of magnetic connection between said contiguous limbs, main and auxiliary poles on said double pole-pieces, said main poles being arranged at unequal angular spacings of 60° and 120° with alternate poles of like polarity, and an exciting winding on each of the yokes of said double pole-pieces and lying within the greater of said unequal angular spacings.

5. In a self-starting single-phase alternating current synchronous motor, the combination of a rotor having six pole-projections and a cage winding with a stator comprising two identical U-shaped double pole-pieces each provided with main and auxiliary poles, said main poles being arranged at unequal angular spacings of 60° and 120° with alternate poles of like polarity, and the unlike poles touching, the smaller of said unequal angular spacings determining the speed of the motor, an exciting winding on each of the yokes of said double pole-pieces and lying within the greater of said angular spacings, and a magnetic circuit closure member connecting together the limbs of each of said double pole-pieces and shaped such that one half thereof follows the arc of the stator bore, for assisting the rotating field, and the other half extends tangentially to the stator bore, for forming a gap therein.

6. In a self-starting single-phase alternating current synchronous motor, the combination of a rotor having six pole-projections and a cage winding with a stator comprising two identical U-shaped double pole-pieces arranged with their limbs contiguous, clamping means for holding said double pole-pieces together, comprising non-magnetic clamps embracing and spacer members between the contiguous ends of said limbs, main and auxiliary poles on said double pole-pieces, said main poles being arranged at unequal angular spacings of 60° and 120° with alternate poles of like polarity, an exciting winding on each of the yokes of said double pole-pieces and lying within the greater of said unequal angular spacings, and a magnetic circuit closure member bridging the limbs of each of said double pole-pieces and shaped such that one half thereof follows the arc of the stator bore, for assisting the rotating field, and the other half extends tangentially to the stator bore, for forming a gap therein.

7. In a self-starting single-phase alternating current synchronous motor, the combination of a rotor having six pole-projections and a cage winding with a stator comprising two identical U-shaped double pole-pieces arranged with their limbs contiguous, non-magnetic means holding said double pole-pieces together, spacer members between the contiguous ends of said limbs for adjusting the degree of magnetic connection between said contiguous limbs, main and auxiliary poles on said double pole-pieces, said main poles being arranged at unequal angular spacings of 60° and 120° with alternate poles of like polarity, an exciting winding on each of the yokes of said double pole-pieces and lying within the greater of said unequal angular spacings, and a magnetic circuit closure member bridging the limbs of each of said double pole-pieces and shaped such that one half thereof follows the arc of the stator bore, for assisting the rotating field, and the other half extends tangentially to the stator bore, for forming a gap therein.

8. In a self-starting single-phase alternating current synchronous motor, the combination with a stator having four equal pronounced poles which are subdivided into main and auxiliary poles, said main poles being arranged at unequal angular spacings of 60° and 120° with alternate poles of like polarity, of a rotor comprising six equal flats forming six equal pronounced rotor poles, said flats being wider in peripheral extent than said rotor poles, and a cage winding comprising an odd number of rods, said number being large compared with the number of said rotor poles and such that adjacent rotor poles have unequal electromagnetic characteristics and weight distribution but alternate rotor poles have the same electromagnetic characteristics and weight distribution, whereby the equilibrium of said rotor is maintained.

9. In a self-starting single-phase alternating current synchronous motor, the combination with a stator having four equal pronounced poles which are sub-divided into main and auxiliary poles, said main poles being arranged at unequal angular spacings of 60° and 120° with alternate poles of like polarity, of a rotor comprising six equal flats forming six equal pronounced rotor poles, said flats being wider in peripheral extent than said rotor poles in the ratio of 3:2 respectively, and a cage winding comprising $9+6n$ rods, $n$ being a positive integer, at equal angular spacings.

10. In a self-starting single-phase alternating current synchronous motor, a rotor comprising a plurality of equal, spaced, flats forming between them the same number of equal pronounced rotor poles, said flats being wider in peripheral extent than said rotor poles, and a cage winding comprising a plurality of rods at equal angular spacing, the number of said rods being large in relation to the number of rotor poles and being related to the ratio of the width of said flats to the width of said rotor poles such that each of said rotor poles has a plurality of said rods associated therewith and the rods of adjacent rotor poles are relatively displaced by one-half the said angular spacing between the rods of said cage winding, and such that the rods of alternate rotor poles are identically disposed.

11. In a self-starting single-phase alternating current synchronous motor, in combination, a stator comprising two identical U-shaped double pole-pieces each provided with main and auxiliary poles, said main poles being arranged at unequal angular spacings of 60° and 120° with alternate poles of like polarity, and the unlike poles touching, the smaller of said unequal angular spacings determining the speed of the motor, and an exciting winding on each of the yokes of said double pole-pieces and lying within the greater of said angular spacings, and a rotor comprising six equal, spaced, flats forming between them six equal pronounced rotor poles, said flats being wider in peripheral extent than said rotor poles, and a cage winding comprising a plurality of rods at equal angular spacing, the number of said rods being large in relation to the number of rotor poles and being related to the ratio of the width of said flats to the width of said rotor poles such that each of said rotor poles has a plurality of said rods associated therewith and the rods of adjacent rotor poles are relatively displaced by one-half the said angular spacing between the rods of said cage winding, and such that the rods of alternate rotor poles are identically disposed.

12. In a self-starting single-phase alternating current synchronous motor, in combination, a stator comprising two identical U-shaped double pole-pieces each provided with main and auxiliary poles, said main poles being arranged at unequal angular spacings of 60° and 120° with alternate poles of like polarity, and the unlike poles touching, the smaller of said unequal angular spacings determining the speed of the motor, and an exciting winding on each of the yokes of said double pole-pieces and lying within the greater of said angular spacings, and a rotor comprising six equal, spaced, flats forming between them six equal pronounced rotor poles, said flats being wider in peripheral extent than said rotor poles in the ratio of 3:2 respectively, and a cage winding comprising a plurality of rods at angular spacings corresponding to the equi-angular spacing of $9+6n$ rods, $n$ being a positive integer, said rods being disposed such that each of said rotor poles has a plurality of said rods associated therewith and the rods of adjacent rotor poles are relatively displaced by one-half the said equi-angular spacing and the rods of alternate rotor poles are identically disposed.

13. In a self-starting single-phase alternating current synchronous motor, in combination, a stator comprising two identical U-shaped double pole-pieces each provided with main and auxiliary poles, said main poles being arranged at unequal angular spacings of 60° and 120° with alternate poles of like polarity, and the unlike poles touching, the smaller of said unequal angular spacings determining the speed of the motor, and an exciting winding on each of the yokes of said double pole-pieces and lying within the greater of said angular spacings, and a rotor comprising six equal, spaced, flats forming between them six equal pronounced rotor poles, said flats being wider in peripheral extent than said rotor poles in the ratio of 3:2 respectively, and a cage winding comprising a plurality of rods arranged at angular spacings of $$\frac{360}{9+6n}$$

degrees, $n$ being a positive integer, around the periphery of the rotor, except at spacings lying at the mid-portions of said flats, which spacings are free from rods.

14. In a self-starting single-phase alternating current synchronous motor, in combination, a stator having four equal pronounced poles which are subdivided into main and auxiliary poles, said main poles being arranged at unequal angular spacings of 60° and 120° with alternate poles of like polarity, and a rotor comprising six equal, spaced, flats forming between them six equal pronounced rotor poles, said flats being wider in peripheral extent than said rotor poles in the ratio of 3:2 respectively, and a cage winding comprising a plurality of rods arranged at angular spacings of $$\frac{360}{9+6n}$$

degrees, $n$ being a positive integer, around the periphery of the rotor, except at spacings lying at the mid-portions of said flats, which spacings are free from rods.

15. A motor as defined in claim 10, in which said rods are of flat cross-section and are disposed in circumferentially distributed radial slots in the rotor.

OTTO JANZEN.